July 29, 1947.   G. P. LUCKEY ET AL   2,424,835
METHOD FOR SURFACING SMALL PARTS
Filed Feb. 10, 1945   2 Sheets-Sheet 1

INVENTORS
GEORGE P. LUCKEY
THEODORE R. SCHWALM
BY Murray W. Gould
ATTY.

July 29, 1947.   G. P. LUCKEY ET AL   2,424,835
METHOD FOR SURFACING SMALL PARTS
Filed Feb. 10, 1945      2 Sheets-Sheet 2

*INVENTOR.*
GEORGE P. LUCKEY
THEODORE R. SCHWALM
BY Murray W. Gould
ATTY.

Patented July 29, 1947

2,424,835

UNITED STATES PATENT OFFICE 2,424,835

METHOD FOR SURFACING SMALL PARTS

George Paul Luckey and Theodore Raymond Schwalm, Lancaster Township, Lancaster County, Pa., assignors to Hamilton Watch Company, Lancaster, Pa.

Application February 10, 1945, Serial No. 577,240

1 Claim. (Cl. 51—281)

The object of this invention is to provide a new method for surfacing and performing other operations on small parts and is directed particularly to the manner in which the small parts are prepared for the surfacing operation.

In industries such as the watch industry, where many small parts have to be surfaced both to a mechanical tolerance for thickness and a high degree of surface finish, the problem of handling the individual parts is one which in the past has given considerable trouble. Heretofore parts have been handled individually or cemented to the surface of a flat piece of metal, have been finished on one side, removed from the metal, reversed, again cemented to the metal and finished on the other side. This is a costly procedure involving many labor difficulties and the results have never been entirely satisfactory.

It is the object of the present invention to provide a new method of surfacing small parts as a group, both sides being surfaced simultaneously or consecutively.

It is an object of the present invention to mount a group of the individual parts so that the group may be handled as a unit and the unit put through a series of surfacing operations both for thickness and for imparting a highly polished surface finish.

It is a further object of the present invention to mount a number of individual small parts in a group so that the group may be treated as a unit and the parts passed through a series of operations with regard to the thickness, surface polish or any operation which may be required on the flat surfaces of the individual parts, or other operations such as drilling, counter boring, reaming, cleaning, etc.

It is a still further object of the present invention to provide a retaining member, within the confines of which a group of individual small parts are located and to maintain said parts in their respective relative positions during any number of a series of operations.

It is a still further object of the present invention to provide a retaining member having a group of small parts and a rest filling the interstices to maintain said small parts in respective relative position, said parts being available for surfacing operations from both sides simultaneously or either side.

It is a still further object of the invention to provide a method of surfacing small parts in groups and treating each group as a unit which method is not to be considered as restricted by the detailed explanation of the invention as shown in the drawings but to be construed as embracing all deviations which may follow within the appended claim.

With the foregoing and other objects in view, the invention resides in the novel arrangement and combination of parts and in the details of construction hereinafter described and claimed, it being understood that changes in the precise embodiment of the invention herein described may be made within the scope of what is claimed without departing from the spirit of the invention.

The invention is illustrated in the accompanying drawing in which.

Figure 1:
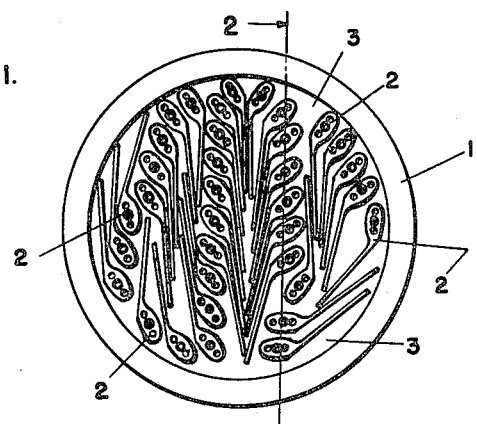
Fig. 1 is a plan view of the retaining member with the small parts in position.
Figure 2:
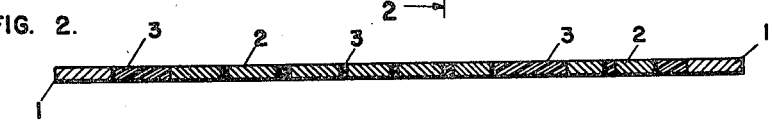
Fig. 2 is an enlarged cross section on line 2—2 of Fig. 1.
Figure 3:
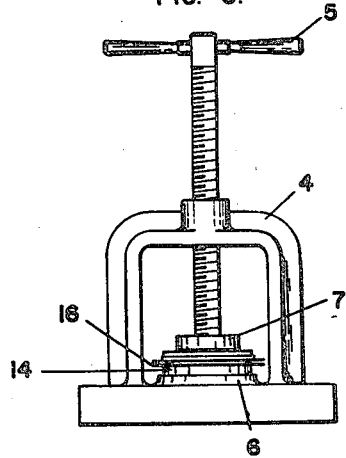
Fig. 3 is a front plan view of the press.
Figure 4:
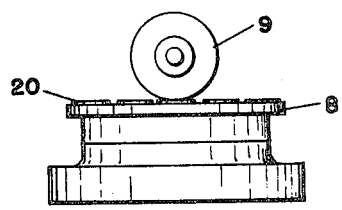
Fig. 4 is a diagrammatic view of the magnetic chuck and grinding wheel for flat grinding a single side.

The method as specifically illustrated shows a retaining ring 1 in which a number of small parts 2 are held in respective relative position by shellac 3, filling the interstices. Referring to Fig. 3, a screw press 4 having a handle 5, a base plate 6 and a top plate 7 is used in the specific illustration of the method thus described. Referring to Fig. 4, a magnetic chuck 8 is used in connection with a grinding wheel 9 to surface the individual parts while held in the retaining rings.

Figure 5:
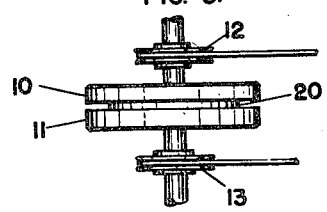
Fig. 5 is a diagrammatic view of a pair of surfacing laps working simultaneously on each side of the small parts.

Fig. 5 shows a pair of laps 10 and 11 driven by pulleys 12 and 13 respectively and surfacing both sides of the small parts simultaneously.

The first step in the application of the method hereinafter specifically described is to mount a flat disc 14 upon an electric hot plate 15, place a paper such as Cellophane 16 upon the disc 14 and lay the ring 1 upon the paper. The small parts 2 are then arranged within the confines of the ring in any manner which will permit the maximum number of small parts to be placed within the retaining member. Powdered shellac is sifted over the entire structure and allowed to fill the interstices by the application of the heat from the hot plate 15 through the disc 14 to the paper 16. The shellac used may be powdered shellac, small pieces of stick shellac or the stick shellac itself may be passed lightly over the heated small parts and allowed to flow so as to fill the space within the retaining member not occupied by the small parts. A second sheet of paper 17 is placed over the assembled group and a rubber pad 18 over the paper. The entire group including the disc 14, the paper 16, retaining ring 1 with its small parts 2, paper 17, and rubber pad 18 is then placed between the upper and lower plates of a press 4, the handle 5 turned to apply a light pressure on the rubber pad 18 and the shellac allowed to cool.

Figure 6:
Fig. 6 is an enlarged cross sectional view similar to Fig. 2 showing the irregularities of the small parts.
Figure 7:
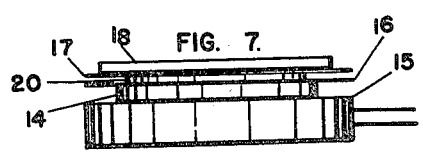
Fig. 7 is a diagrammatic view of the separate parts resting on an electric heating unit.
Figure 8:
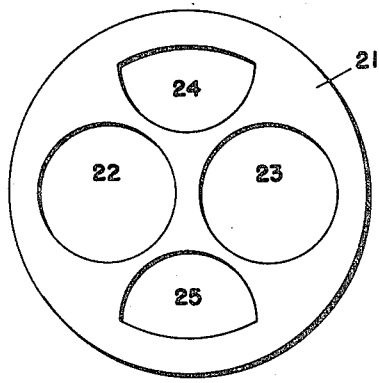
Fig. 8 is a modification of the retaining member.
Figure 9:
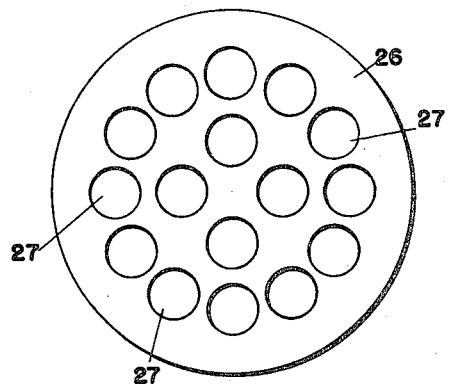
Fig. 9 is also a modification of the retaining member.
Figure 10:
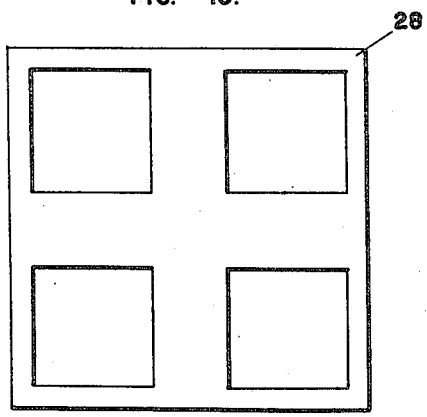
Fig. 10 shows the retaining member in the form of a square.

The application of the pressure through the medium of a rubber pad and against a steel or metal disc 14 permits any irregularities in the thickness of the parts to be projected entirely at one side of the assembled disc (as shown exaggerated in Fig. 6 at 19). Advantage of this may be taken in various ways but particularly in surface grinding for thickness where the operation of grinding is simpler on the side having all of the parts in a single plane.

After cooling the unit which may be hereinafter referred to as 20 is removed from the press, the Cellophane paper removed as much as possible with hand and the excess shellac scraped from the edges. The small parts are then ready for any one of a series of operations which may be hereafter performed upon them. Specifically illustrated Figs. 4 and 5 are a grinding operation in which the sides are finished consecutively by applying the units 20 to a magnetic chuck, revolving the chuck at a slow speed while surface grinding with an ordinary abrading wheel 9. Another specific example of an operation is a polishing operation which may be carried out on both sides simultaneously as shown in Fig. 5 where the unit 20 is mounted between two lapping discs and the surfacing operation carried out.

The method which has been heretofore described is but a specific example of any of numerous ways in which the broad idea of mounting small parts in groups to be treated as a unit could be applied. This method has an advantage of a saving in labor over the methods previously used in that a single operation necessary to group the small parts in units is all that is necessary to prepare them for any number of a series of operations which may be carried out on the small parts as a group. The value of such a method cannot be overestimated as the trend towards higher wages makes any method which produces the same or equivalent results with a great deal of less expenditure a valuable one.

Referring specifically to the modification shown in Figs. 8, 9, 10, and 11, the retaining member 21 is shown having openings 22, 23, 24, and 25 of any desired shape or form. The main purpose of the modification is to insure sufficient bonding strength between the shellac and the retaining member so that there can be no chance of rupture during any of the numerous operations to which the parts may be subjected. Also should the parts to be finished be of a non-magnetic material such as brass or plastic, the retaining member itself being made of a magnetic attracted material would provide sufficient surface to maintain the entire unit in contact with a magnetic chuck.

The retaining member 26 shows a series of identical holes 27 in which individual pieces to be worked upon could be mounted and held therein by means of shellac. This would be useful for a number of operations such as flat grinding, lapping, even drilling with multiple chucks at one and the same time and also presents the same advantages as the retaining member 21.

The retaining member 28 is made in the form of a square and likewise has the advantages of retaining members 21 and 26 in having a large magnetic attracted surface and provides square openings which might in some cases of surfacing have an advantage over other shaped openings.

Figure 11:
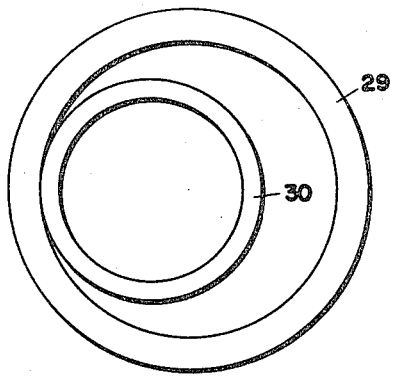
Fig. 11 shows a retaining ring having a floating retaining member mounted within it.

Fig. 11 shows a retaining member 29 having a second retaining member 30 loosely mounted therein, the retaining member 30 alone being designed to hold the same parts to be worked upon. Particular advantage of the retaining member as shown in Fig. 11 would be in finished surfacing between laps where the movement of the floating member 30 would prevent patterns being formed in the surface due to the action of the lap.

What is claimed is:

A method of surfacing small parts consisting in grouping said parts within the confines of a steel ring of less thickness than the parts to be surfaced, filling the interstices with hot fluid shellac, applying yielding pressure to one side of said group and a flat unyielding surface to the other side of said group while said shellac is fluid, cooling said group while under pressure to form one side of said group in a flat plane surface, mounting said group on a magnetic chuck, either side up, flat grinding said uppermost side as a unit, removing said group from said chuck and turning it to present the unsurfaced side, flat grinding said unground side as a unit and dissolving said shellac.

GEORGE PAUL LUCKEY.
THEODORE RAYMOND SCHWALM.

REFERENCES CITED

The following references are of record in the file of this patent:

UNITED STATES PATENTS

| Number | Name | Date |
| --- | --- | --- |
| 1,486,341 | Hoke | Mar. 11, 1924 |
| 1,486,345 | Hoke | Mar. 11, 1924 |
| 1,536,714 | Hoke | May 5, 1925 |
| 1,541,001 | Searles | June 9, 1925 |
| 1,541,003 | Smith | June 9, 1925 |
| 1,541,865 | Smith | June 16, 1925 |
| 689,933 | Underwood | Dec. 31, 1901 |
| 949,760 | Flad | Feb. 22, 1910 |
| 1,143,895 | Essick | June 22, 1915 |
| 1,284,283 | Flad | Nov. 12, 1918 |
| 1,911,153 | Hill | May 23, 1933 |
| 2,352,178 | Bolsey | June 27, 1944 |
| 1,973,511 | Schmalz | Sept. 11, 1934 |
| 2,312,299 | Stetler | Feb. 23, 1943 |
| 2,113,874 | Chanik | Apr. 12, 1938 |
| 1,438,100 | Dey | Dec. 5, 1922 |
| 407,990 | Bausch | July 30, 1889 |
| 2,375,003 | Kent | May 1, 1945 |
| 1,377,119 | Eaton | May 3, 1921 |
| 2,328,302 | Simison | Aug. 31, 1943 |
| 2,378,243 | Penberthy | June 12, 1945 |
| 2,393,073 | Tenny | Jan. 15, 1946 |
| 2,394,645 | Turner et al. | Feb. 12, 1946 |